Figure 1:
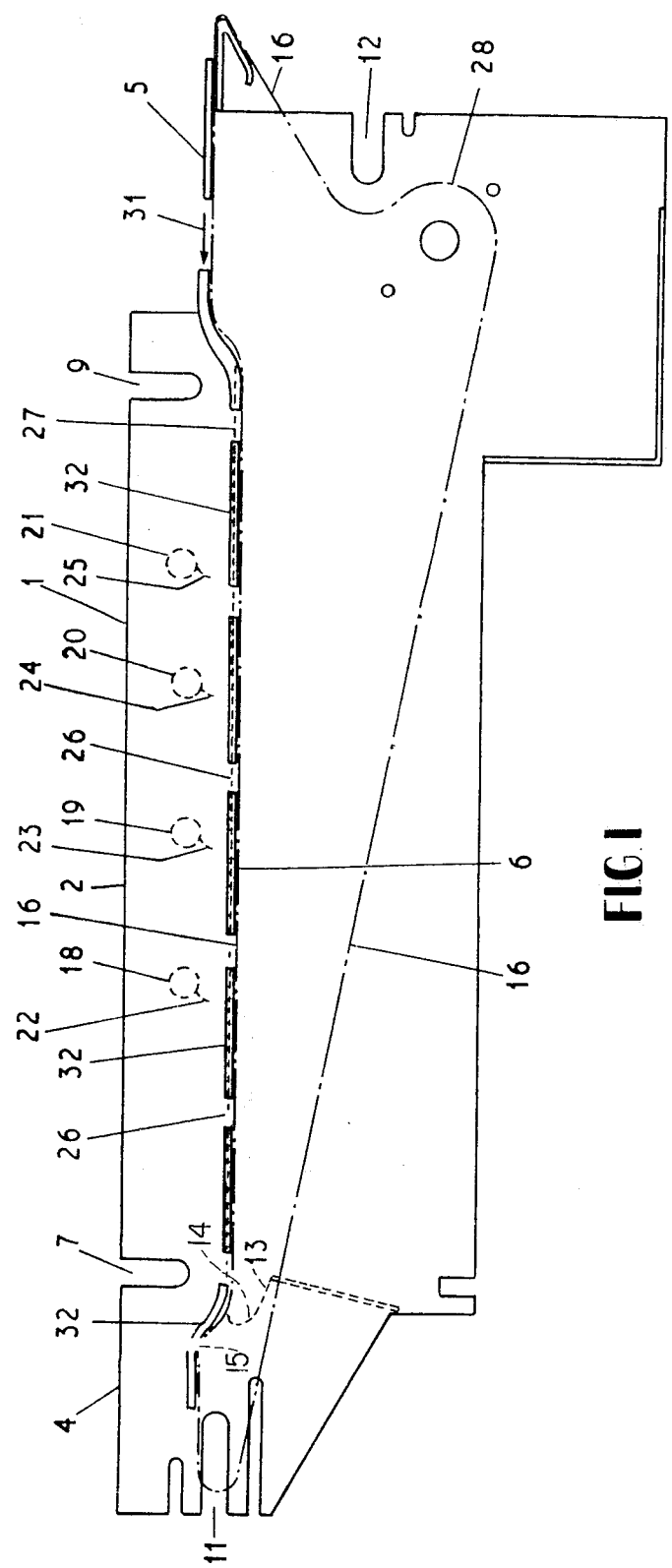

United States Patent
Dexter et al.

[11] 3,966,983
[45] June 29, 1976

[54] METHOD AND APPARATUS FOR TREATING FOOD PIECES

[75] Inventors: Edward Dexter, Blaby; Stephen Reverdy Otley, Long Whatton, near Loughborough, both of England

[73] Assignee: United Biscuits Limited, Edinburgh, Scotland

[22] Filed: Nov. 7, 1974

[21] Appl. No.: 521,846

[30] Foreign Application Priority Data
Nov. 15, 1973 United Kingdom............ 53093/73

[52] U.S. Cl............................. 426/439; 426/438; 426/496; 426/505; 426/523
[51] Int. Cl.²...................... A21D 6/00; A23L 1/01
[58] Field of Search.......... 426/438, 439, 465, 466, 426/505, 497, 496, 517, 307, 305, 302, 523; 99/483

[56] References Cited
UNITED STATES PATENTS

| | | | |
|---|---|---|---|
| 1,926,313 | 9/1933 | Smith | 426/439 |
| 2,463,112 | 3/1949 | Kiphis | 426/439 |
| 2,855,308 | 10/1958 | Buechele et al. | 426/438 |
| 2,907,659 | 10/1959 | Anetsberger et al. | 426/438 |
| 3,213,778 | 10/1965 | Martino | 426/438 |
| 3,709,698 | 1/1973 | Davis | 426/438 X |
| 3,718,485 | 2/1973 | Lankford | 426/438 |
| 3,809,777 | 5/1974 | Thompson | 426/438 |

FOREIGN PATENTS OR APPLICATIONS

| | | | |
|---|---|---|---|
| 1,034,035 | 6/1966 | United Kingdom | 426/438 |

*Primary Examiner*—S. Leon Bashore
*Assistant Examiner*—Kenneth M. Schor
*Attorney, Agent, or Firm*—Darbo, Robertson & Vandenburgh

[57] ABSTRACT

Thin slices of dough or other food which slices are apt to become distorted as a result of normal deep fat frying are precooked to give them a stiffness before they are deep fat fried. The precooking takes place on a foraminous screen which passes through a bath of hot oil at a depth such that the thin food slices resting on the screen are immersed to such a limited extent that they do not float but remain firmly resting on the screen. While in the bath hot oil is applied to the top of the food pieces.

7 Claims, 3 Drawing Figures

3,966,983

METHOD AND APPARATUS FOR TREATING FOOD PIECES

BACKGROUND OF THE INVENTION

The invention relates to the frying of flat pieces, sheets, slices and other suitable configurations of food in either its natural or manufactured state.

One of the problems encountered in frying food is that it distorts, and acquires unattractive shapes.

Attempts have been made to curb this tendency and to produce fried food products which are more dimensionally stable.

At the same time, it is desirable to reduce any stickiness in the product.

SUMMARY OF THE INVENTION

The invention provides a method of pretreating food produce, either natural or manufactured, before the final continuous frying process by wetting the surface of the food produce with hot oil while passing partly immersed through a shallow hot oil bath.

The process has been devised for the pretreatment of dimensionally unstable food produce with a moisture content of between 30 – 60%, to condition the stiffness and surface texture of the produce before feeding into a continuous production fryer, but can be adapted for other frying requirements.

The invention offers a method of pretreatment for dimensional and sectional stability that can be utilised with continuous frying processes, while other methods of pretreatment proposed involve such time consuming processes as dehydration to 8 – 10% moisture and large storage facilities.

DESIGNATION OF FIGURES

Figure 2:
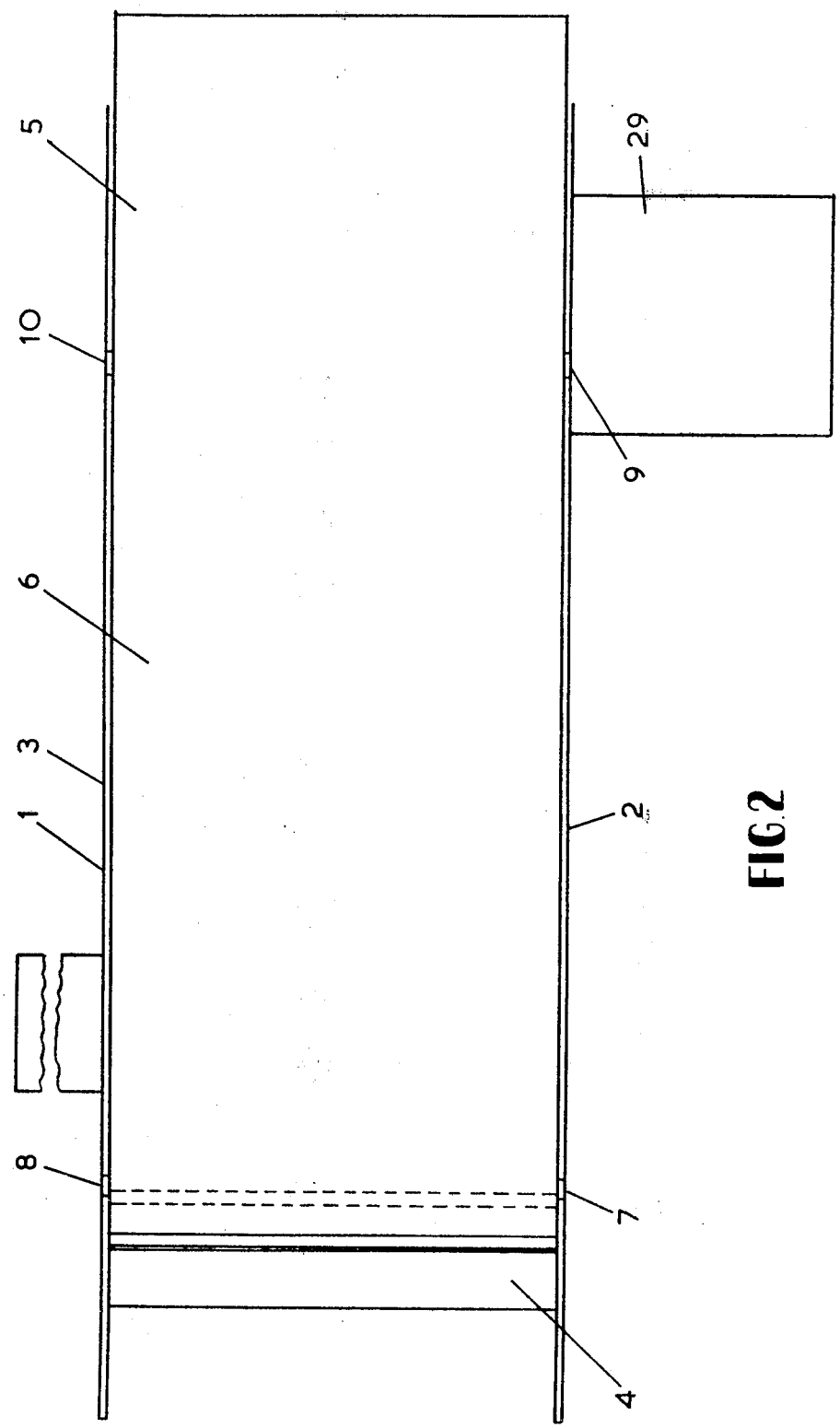
Figure 3:
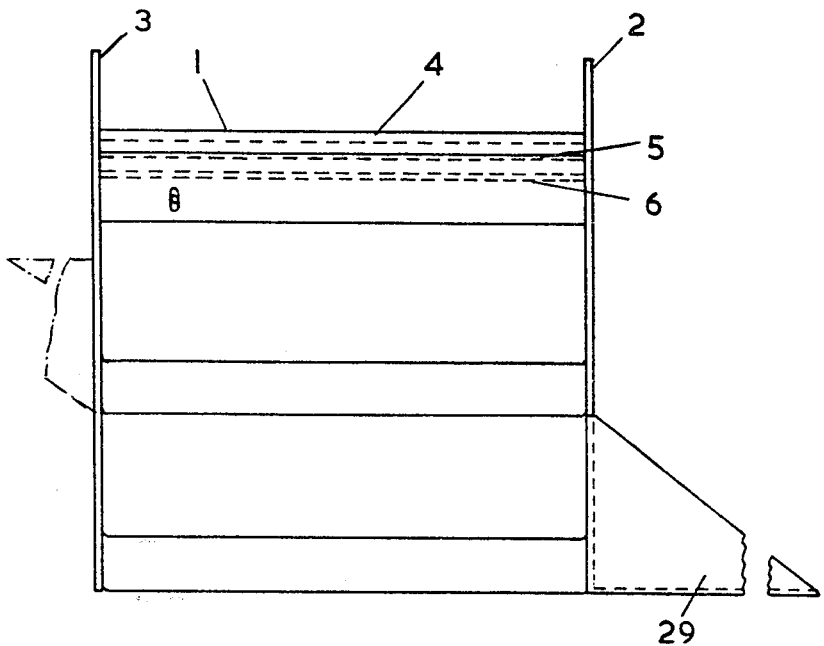

FIG. 1 is a side view of a pretreatment apparatus,
FIG. 2 is a plan view of the apparatus of FIG. 1, and
FIG. 3 is an end view of the apparatus of FIGS. 1 and 2.

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

GENERAL DESCRIPTION OF THE INVENTION

The apparatus is referred to as a pretreatment apparatus because it is used to give a required characteristic to the food or food product before it is passed to the final continuous frying step in the process.

The particular apparatus to be described is employed in the processing of a manufactured food. In the particular example the manufactured food is made by mixing rusk with a raw starch and water to a dough, forming the dough into pieces and frying the pieces. However, the dough can be passed on other materials, for example potatoes. Alternatively, food in its natural form, for example potato slices, can be pretreated in the way to be described.

Referring to the drawing there is shown a bath 1 made of stainless steel and having sides 2 and 3 and end portions 4 and 5 raised above the bottom 6 of the bath. The end portion 4 of the bath includes a member 13 having a cut-out portion 14 at one end which acts as a level control or weir for oil in the bath. Oil flowing out through the portion 14 is led by a drain tube (not shown) to the reservoir and used again. The member 13 provides a guide over the curved part 15 of its surface for the passage of a porous endless woven conveyor belt 16 made of stainless steel passing through and around the bottom of the bath as described below.

Hot oil for pretreating pieces of dough carried on the belt 16 is supplied to the bath 1 through slots in a series of tubes 18 to 21 in the form of liquid curtains as indicated at 22 to 25, the slots extending across the width of the bath and acting as weirs.

The endless conveyor belt 16 is held beneath the level 26 of oil 27 in the bath by first and second guide elements (not shown) mounted on spindles extending between slots 7, 8 and slots 9, 10. The first and second guide elements each comprise a pair of coplanar toothed wheels which mesh with the woven conveyor belt, one pair being mounted near to each end of the spindles. A third guide element (not shown) mounted between the slot 11 and its corresponding slot in the side 3 is a grooved roller which meshes with the belt 16 and guides the belt 16 emerging over the curved surface 13 around the front of the bath so that it passes beneath the bottom 6 of the bath between the sides 2 and 3. The belt 16 is then guided around a drive member which comprise a series of toothed wheels mounted on a spindle, as indicated at 28, to a fourth guide element (not shown) which is a further stainless steel tubular roller mounted between the slot 12 and its corresponding slot in the side 3. The drive member is driven by a motor (not shown) for which a support 29 is provided.

In operaton, hot oil at the normal frying temperature for the food to be fried is fed continuously into the bath 1 through the tubes 18 to 21 and through their slotted weirs in the form of curtains 22 to 25 and the level 26 of the oil 27 in the bath is maintained by the setting of the height of the cut-out portion 14 in the member 13 above the bottom 6 of the bath 1. Oil flowing over an outlet weir formed by the cut-out portion 14 is returned by gravity to a reservoir before being recirculated by an electric pump. The conveyor belt 16 is driven in such a way that it moves in the direction of arrow 31 so that it passes through the oil 27 from the end portion 5 to the end portion 4 of the bath 1.

Food to be pre-treated is fed on to the conveyor as it passes over the end portion 5 of the bath. In one embodiment the food to be pre-treated was in the form of flat pieces 32 of dough which had been cut from a rolled sheet dough mixture containing 50% water. The pieces 32 on the wire conveyor belt were passed into the bath 1 at such a rate that they were in the oil for approximately 15 seconds. The oil level 26 was maintained at such a height that the pieces 32 on the belt 16 were only half submerged in the oil 27. The tubes 18 to 21 were arranged at a height of approximately ½ inch above the conveyor belt 16 and with a spacing of approximately three to four inches between them. The hot oil was pumped to the tubes 18 to 21 at a temperature of 350°F. and at a rate of 2 gallons per minute per square foot of processing area of the bath 1. No pressure of the oil on to the food produce is essentially required at least in most cases, the purpose of the oil rain being to keep the upper parts of the produce thoroughly wetted throughout their passage through the apparatus.

The pieces 32 enter freely on to the conveyor between the toothed wheels of the first and second guide elements in their passage through the bath and the arrangement is such that all of the surfaces of the pieces are wetted by the hot oil while remaining firmly resting on the belt. Upon reaching the end portion 4 of the tank, the pieces 32 are delivered by the belt 16 to a continuous production fryer (not shown).

The treatment of the pieces in the apparatus described gives them a stiffness which is sufficient to enable them to be fried by known multi-layer frying techcniques in the continuous producton fryer with a minimum of distortion.

The treatment is particularly suitable for natural or manufactured foods having a moisture content between 30% and 60%. Such foods when treated in the way described have their surface texture modified and their stiffness increased to an extent sufficient to reduce distortion during frying to a mininum. Without the treatment described such foods are unstable in that they are liable to become distorted during frying in the way that potato crisps or chips become distorted during frying.

It will be understood that the particular embodiment has been described by way of example only and that variations and modifications can be made within the scope of the invention.

Thus the food produce treated may be natural or be made by some other process than cutting from sheets, for example it may be extruded and chopped into short lengths. A manufactured food may be based on other materials than a grain based dough. It may be based on a root vegetable, for example, the potato, or on a meat product. The hot oil in the particular embodiment is fed in the form of curtains so that it flows over the pieces being treated to provide a flow of oil in the bath and maintain the temperature. However, it could be fed in other ways, for example as an overall spray and assistance could be given in maintaining the temperature of the oil in the bath by a thermostatically controlled heating element.

The operating parameters, for example the feed rate of the conveyor belt, the temperature of the oil and the height of the tubes 18 to 21 above the pieces 32 can be adjusted according to the nature of the material being treated.

The treatment is particularly useful when the pieces to be fried have sticky surfaces, since the treatment can reduce or even eliminate, in some cases, the adhesive characteristics of the surfaces before the pieces are deep fat fried.

The invention has particular application in a continuous manufacturing process where untreated pieces are fed in at one end of the apparatus and passed continuously through to the frying apparatus.

The embodiments of the invention in which an exclusive property or privilege is claimed are defined as follows:

1. In the process of cooking food comprising relatively thin pieces having two generally flat and sticky faces, having a relatively small dimension between said faces as compared to the size of said faces and having a moisture content between thirty and sixty percent, which food is to be fried in a continuous succession to a desired degree, the improvement wherein said pieces are pretreated prior to said frying to minimize the distortion which tends to occur because of the thinness of the pieces comprising the steps of:

supporting said pieces on one of said faces, continuously passing said pieces while so supported in succession through a bath of hot oil with the pieces being only partially immersed therein whereby the pieces do not tend to float but remain firmly supported at said one face, and while said pieces are in said bath applying hot oil to the upper surfaces of said pieces, said pieces being in said bath for a period of time sufficient to give them a stiffness but insufficient to cook them to said desired degree; and thereafter removing said pieces sequentially from said bath and subjecting them to said frying to an extent sufficient to cook them to said desired degree.

2. In the process of claim 1, wherein said food is a dough and said oil applied to the upper surface of said pieces has a temperature when applied of about 350° F.

3. In the process of claim 2, wherein the pieces are only half immersed in the oil of the bath.

4. In the process of claim 1, wherein the pieces are only half immersed in the oil of the bath.

5. In the process of claim 4, wherein said one face is supported at a plurality of spaced areas defining spaces therebetween whereby the hot oil of said bath can contact the one face at said spaces.

6. In the process of claim 1, wherein said one face is supported at a plurality of spaced areas defining spaces therebetween whereby the hot oil of said bath can contact the one face at said spaces.

7. In the process of continuously cooking food comprising relatively thin pieces of rusk containing dough having two generally flat faces, having a relatively small dimension between said faces as compared to the size of said faces and having a moisture content between thirty and sixty percent, which pieces are to be deep fat fried in a continuous succession to a desired degree which deep fat frying normally results in distortion of the pieces because of the thinness thereof, the improvement to decrease the amount of distortion comprising the steps of:

precooking said pieces sufficiently to give them a stiffness, but insufficient to provide said desired degree of cooking thereof, and thereafter deep fat frying said pieces to said desired extent, said precooking being performed by supporting said pieces at a plurality of spaced areas on one of said faces, with the portions of said one face intermediate said areas being unobstructed, while so supported passing said pieces in succession through a bath of hot oil whereby the oil is free to contact said portions of said one faces, limiting the immersion of the pieces in said bath to an extent such that the pieces remain firmly supported on said spaced areas.

* * * * *